United States Patent
Eyran et al.

[11] Patent Number: 5,912,958
[45] Date of Patent: Jun. 15, 1999

[54] ON-HOLD DEVICE

[75] Inventors: Giora Eyran, Fairlawn; Michael D Lynes, Wantage, both of N.J.; David Eric Ostergan, Pinebush, N.Y.

[73] Assignee: Bogen Communications, Inc.

[21] Appl. No.: 08/682,981

[22] Filed: Jul. 16, 1996

[51] Int. Cl.[6] .............................. H04M 9/00; H04M 1/60; H04M 15/00
[52] U.S. Cl. ............................................. 379/170; 379/128
[58] Field of Search .............................. 379/170, 67, 68, 379/83, 128, 131, 157, 162, 198, 201, 217, 374, 167, 393; 455/31.2, 31.3, 31.1; 395/200.07, 200.08, 200.09; 340/825.69, 825.72; 381/77, 80, 81, 85

[56] References Cited

U.S. PATENT DOCUMENTS

| | | | |
|---|---|---|---|
| 4,376,875 | 3/1983 | Beirne | 379/164 |
| 4,408,102 | 10/1983 | Lumpkin . | |
| 4,548,510 | 10/1985 | Levine | 368/41 |
| 4,629,832 | 12/1986 | Carson et al. | 379/381 |
| 4,703,416 | 10/1987 | Crupi et al. | 379/165 |
| 4,850,012 | 7/1989 | Mehta et al. | 379/157 |
| 4,912,457 | 3/1990 | Ladd | 340/573 |
| 4,942,598 | 7/1990 | Davis | 379/67 |
| 4,984,098 | 1/1991 | Buntsis | 340/692 |
| 5,032,716 | 7/1991 | Lam et al. | 250/221 |
| 5,264,822 | 11/1993 | Vogelman et al. | 340/825.36 |
| 5,363,434 | 11/1994 | Farinelli et al. | 379/170 |
| 5,504,675 | 4/1996 | Cragun et al. | 340/825.35 |
| 5,633,920 | 5/1997 | Kikinis et al. | 379/130 |
| 5,666,428 | 9/1997 | Farinelli et al. | 379/102.02 |

*Primary Examiner*—Curtis A. Kuntz
*Assistant Examiner*—Rexford Barnie
*Attorney, Agent, or Firm*—McDermott, Will & Emery

[57] ABSTRACT

A system and a method for connecting an on-hold audio device to a pager in a PBX system is disclosed. The system and method include digitally downloading messages from a server over a communication link to the on-hold device so that convenient and clear means for distributing new messages is provided. The server can also download updates to the operating system. The new apparatus preferably includes a microcontroller, flash memory, a data modem, DAA interface circuitry, audio processor circuitry and audio conditioning circuitry.

9 Claims, 10 Drawing Sheets

5,912,958

ON-HOLD DEVICE

BACKGROUND OF THE INVENTION

The present invention relates to on-hold telephone devices. It also relates to an interface between on-hold devices and pagers in a PBX environment and to the digital downloading of signals to the on-hold devices.

Many businesses have PBX equipment to provide their telephone service. One standard peripheral for a PBX are "on-hold" players, which provide music or other announcements to callers who are placed on hold. Examples of on-hold players are Bogen Communication Corporation's HSR product, Neltech's TELink700 product and Premier's 10H2000RU product.

Businesses with chains of stores commonly use on-hold devices. Each store in the chain typically has common messages that announce sales, store hours and other information that is common to all stores in the chain. In many cases, these chains prefer that each on-hold device be programmed to play the same message or messages.

Existing on-hold devices have several drawbacks, particularly as far as the chains of stores are concerned. First, the ability of the chains to change the message at the on-hold devices at each store is limited. One method in use today to change messages is to send a tape through the mail. The tape is then inserted into the equipment and the new message downloaded into the equipment. This method, however, is slow—typically taking several days to accomplish. A newer method allows the message to be downloaded in analog format from a remote location, usually over a telephone line.

This method is problematic due to the noise from the telephone line, which can be considerable, finding its way into the message.

The second limitation is noticed when it is desired to change the operating system software or other software. Such a change generally requires that the equipment be brought off-line so that it can be connected to a controller in order for the new software to be downloaded. This severely limits the ability to update the equipment.

Today's on-hold devices also have other limitations. For example, they are not capable of interfacing to equipment other than a PBX. Therefore, they offer limited functionality.

In view of these and other limitations, new and improved on-hold devices are needed.

SUMMARY OF THE INVENTION

In accordance with one aspect of the present invention, a pager and a music on-hold device that includes memory to store a message are provided. An audio output from the music on-hold device is connected to the pager and the music on-hold device causes the stored message to be selectively played over the pager. The message can either be played periodically or it can be played upon the occurrence of an event, for example, when a customer enters a store. The message can be anything, for example, an announcement of sales or other promotional news.

In accordance with a further aspect of the present invention, the on-hold device includes sufficient memory to store a plurality of messages as well as means for determining time of day. Then, the music on-hold device causes a selected one of the messages to be played over the pager in accordance with the time of day.

In accordance with another aspect of the present invention, the music on-hold device, includes a digital communication interface, such as a modem, that allows digital signals to be sent to it. The on-hold device further includes a microcontroller for responding to an incoming download command signal on the modem interface and then storing the download signals that follow in memory. The downloaded digital signal transmitted can be an audio signal for use by the PBX during on-hold situations, an audio signal for use by a pager or it can be the operating system of the on-hold device.

The invention will now be described in connection with certain illustrated embodiments; however, it should be clear to those skilled in the art that various modifications, additions and subtractions can be made without departing from the spirit and scope of the claims.

DESCRIPTION OF THE PREFERRED EMBODIMENT

Figure 1:
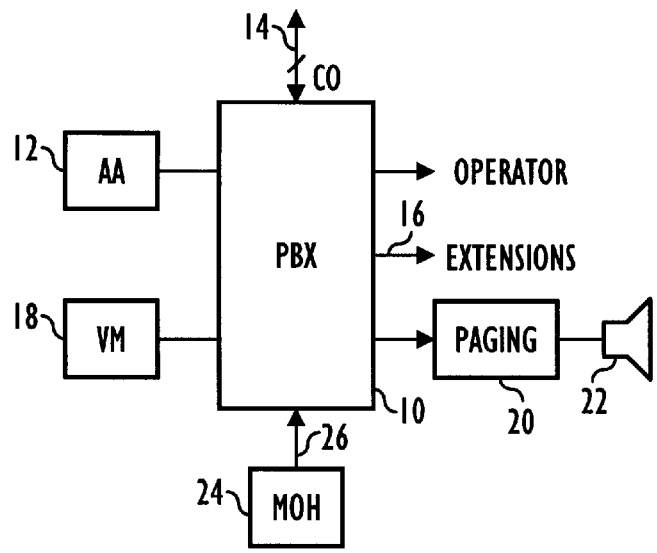
FIG. 1 illustrates a PBX system with peripherals arranged in a known arrangement.

In FIG. 1, a PBX 10 and several peripherals, arranged in a known configuration, are illustrated. The peripherals include an auto attendant 12 that has the capability to interactively guide a caller on the telephone lines 14 to enter the proper extension so that the call can be routed on a bus 16. Also included is a voice mail system 18 that allows a caller to leave a message for particular persons. Further, there is a pager 20 that typically allows the operator and others to send paging messages over a speaker 22.

Another peripheral frequently used is a music on-hold device 24, which stores music or other announcements which are sent to the on-hold bus 26 of the PBX 10 and then played to a caller on the telephone lines 14 when a caller is placed on-hold. The announcements can include hours of operations, upcoming promotional information, or any other message. These on-hold devices are well known in the art. See, for example, Bogen's HSR system, Neltech's TELink700 product and Premier's 10H2000RU product.

Figure 2:
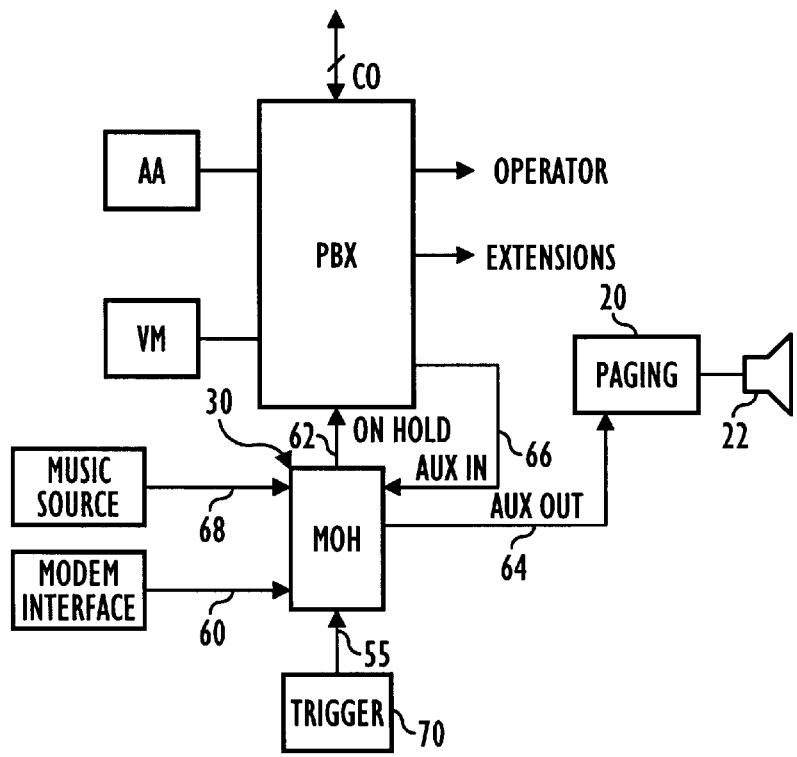
FIG. 2 illustrates a PBX system configured in accordance with a preferred embodiment of the present invention.

In FIG. 2, a system that uses a new on-hold device 30 in accordance with a preferred embodiment of the present invention is illustrated. This system allows the new on-hold device 30 to be utilized to selectively broadcast stored audio from memory in the device 30 and/or from another audio source (e.g., a CD music source) to the pager 20.

Figure 3:
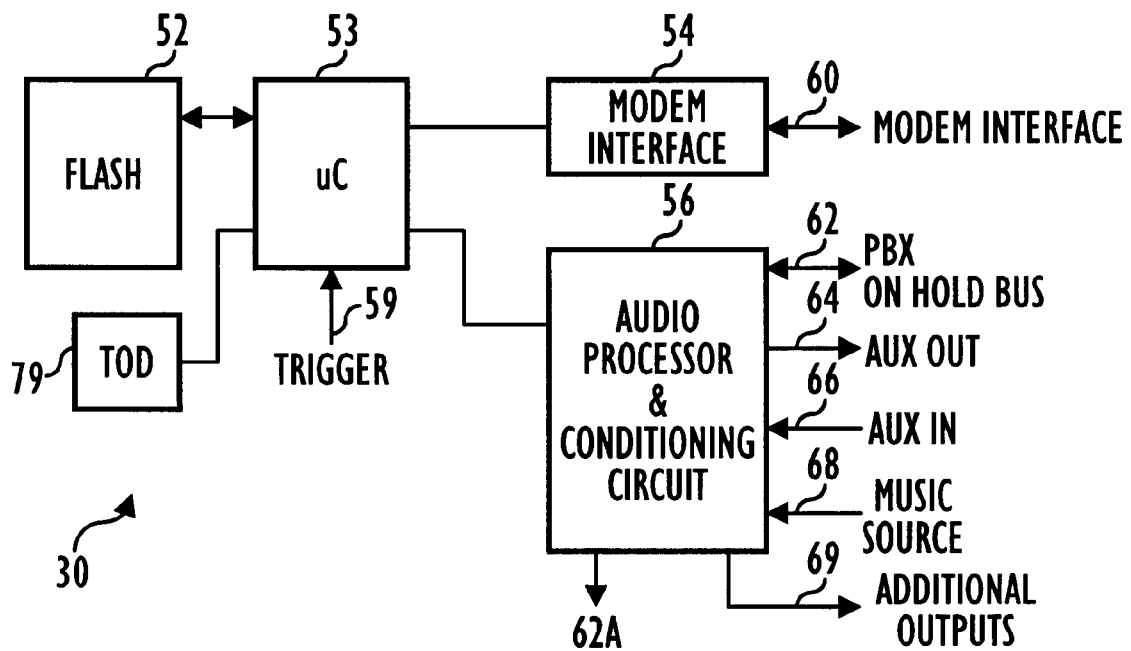
FIG. 3 illustrates an on-hold device in accordance with a preferred embodiment of the present invention.

Referring now to FIG. 3, the modified on-hold device 30 is illustrated. The preferred embodiment of the on-hold device 30 includes a microcontroller 50, memory 52, a modem 54 and audio processing and conditioning circuitry 56. The microcontroller 50 includes an input 58 for a TRIGGER signal. The modem interface 54 includes an input/output 60 for a communications line. The audio processing and conditioning circuit 56 includes several inputs and outputs. First, it includes a standard output 62 for the PBX ON-HOLD BUS. Additionally, it includes another audio output 64 (AUX OUT) and two audio inputs 66 (AUX IN) and 68 (MUSIC SOURCE). Additionally, the output 62 can be expanded to multiple outputs 62A to provide an interface to multiple on-hold PBX buses.

Referring now to FIGS. 2 and 3 together, the operation of the on-hold device 30 in a mode referred to as the "storecasting" mode, will be explained. The announcement or other message that is to be played over the pager 20 is stored in the memory 52. The memory 52 can be any type of memory, however, a flash memory device is preferably used as it permits data integrity without a battery, as will be appreciated by one skilled in the art. On a periodic basis, which period is either programmed or downloaded into the microcontroller 50, the microcontroller 50 accesses the memory 52 to retrieve the stored message and sends the message to the audio processing and conditioning circuitry 56. The microcontroller 50 further controls the audio processing and conditioning circuitry 56 so that audio signals are output on the AUX OUT output 64 (in other modes, the output can be on other outputs, such as the PBX hold bus output 62). Thus, the audio processing and conditioning circuitry 56 sends the message to the pager 20 which then causes the message to be broadcast on the speaker 22. Further, while it is presently preferred to broadcast, it is also possible to implement zoned messaging by the use of additional auxiliary outputs 69 (as well as additional pagers and speakers). In this case, the microcontroller 50 can selectively route any audio signals to any desired zone by selectively directing the signal on the outputs 64 and 69.

In accordance with an alternative embodiment of the present invention, the microcontroller 50 can operate in the same manner as just described, except instead of operating periodically, the microcontroller 50 can be triggered by an external device on the TRIGGER input 58. In accordance with this embodiment, every time a signal is received on the TRIGGER input 58, the microcontroller 50 retrieves the message from the appropriate location in the memory 52 and causes the audio processing and conditioning circuit 56 to output the message to the pager 20.

Figure 4:
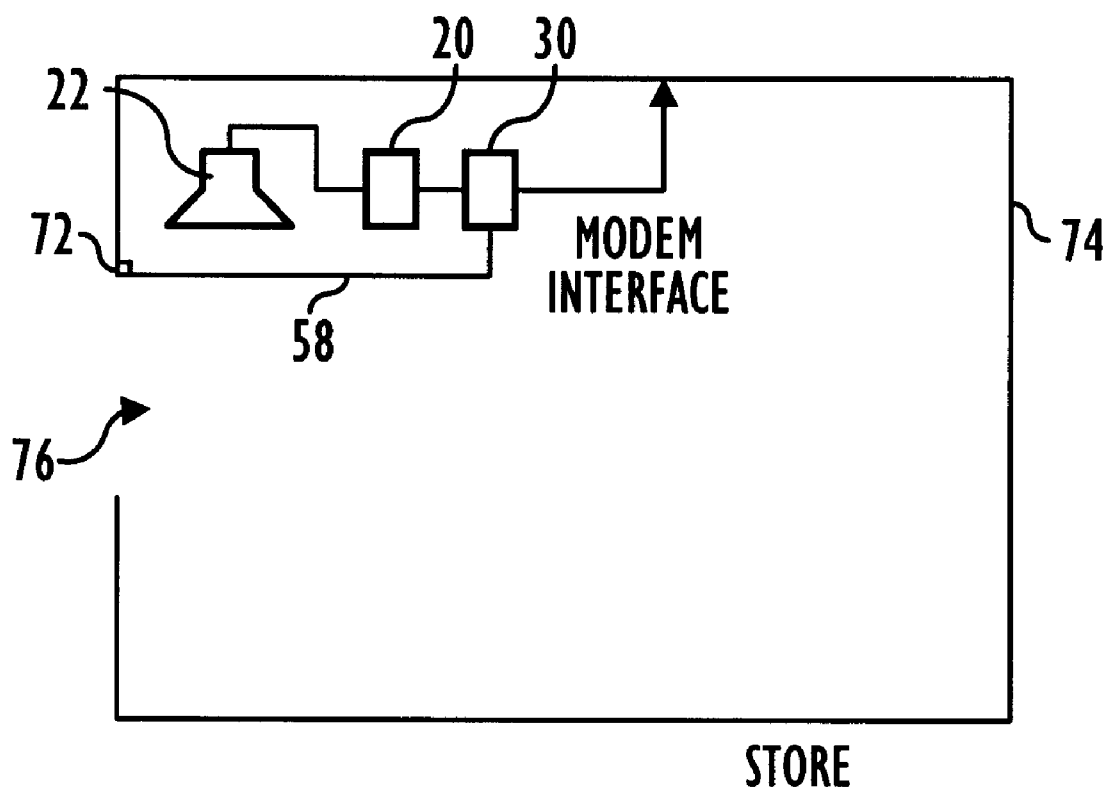
FIG. 4 illustrates the use of one aspect of the present invention in a store.

In FIG. 4, the use of the on-hold device 30 to provide triggered broadcasts is shown. In FIG. 4, only the on-hold device 30 and the pager 20 are shown—the PBX 10 and its other peripherals can be present, but are not shown. A device 72 that detects the presence of persons or the occurrence of events is strategically positioned in a store 74. For example, in FIG. 4, the detection device 72 is positioned near a door 76 to detect the entrance of a person through the door. The detection device 72 could, however, be placed near a sales rack or near another desired area.

The detection device 72 can be any type of detector. By way of example only, the device 72 can be an infrared detector, an acoustic detector, an ultrasound detector or a contact/pressure switch. In general, the device 72 need not be very complex and can be a relatively inexpensive detector.

When the detection device 72 detects the presence of a person or the occurrence of an event, it sends a trigger signal to the on-hold device 30 over the line 58. In the on-hold device 30, the microcontroller 50 accesses the memory 52 to retrieve the appropriate message and then sends the message through the audio processing and conditioning circuitry 56. The circuitry 56 causes the stored message to be transmitted on the AUX OUT output 64 so that the stored message is passed to the pager 20 and then broadcast over the speaker 22, as previously described. Thus, the present invention provides the capability of announcing messages to store customers based on their location within the store or based on the occurrence of an event.

In accordance with another embodiment of the present invention, the on-hold device 30 includes means for determining the time of day 79. Such devices are well known to those skilled in the art. In accordance with this embodiment, the microcontroller 50 reads the time of day from the device 79 and at intervals, which are programmed or downloaded into the microcontroller 50, the stored messages are retrieved and sent to the pager 20 for broadcasting over the speaker 22, as previously described.

The on-hold device 30 has other audio inputs 66 and 68. When the on-hold device 30 is not causing a message to be broadcast on the paging system 20 and 22, the audio processing and conditioning circuit 56 can be controlled to send audio signals from these inputs 66 and 68 to the pager 20.

To take advantage of this functionality, the PBX 10 output which normally is connected to the pager 20 is preferably connected instead to the AUX IN input 66. Then, when the operator or one of the extensions attempts to send a page message, the message is routed through the PBX 10, to the on-hold device 30 and then to the pager 20 and the speaker 22. When a page from the PBX 10 is sensed, the audio processing and conditioning circuitry 56 connects the signal on the AUX IN input 66 to the AUX OUT output 64 so that the page is broadcast on the speaker 22.

Additionally, a music source, such as a CD or tape player, can be connected to the audio input 68 of the on-hold device 30. When there is no page and no stored announcement, the microcontroller 50 causes the audio processing and conditioning circuitry 56 to connect the audio input 68 to the output AUX OUT 64 so that the music source is connected to the paging system 20 and 22, thereby allowing background music to be played.

Figure 5:
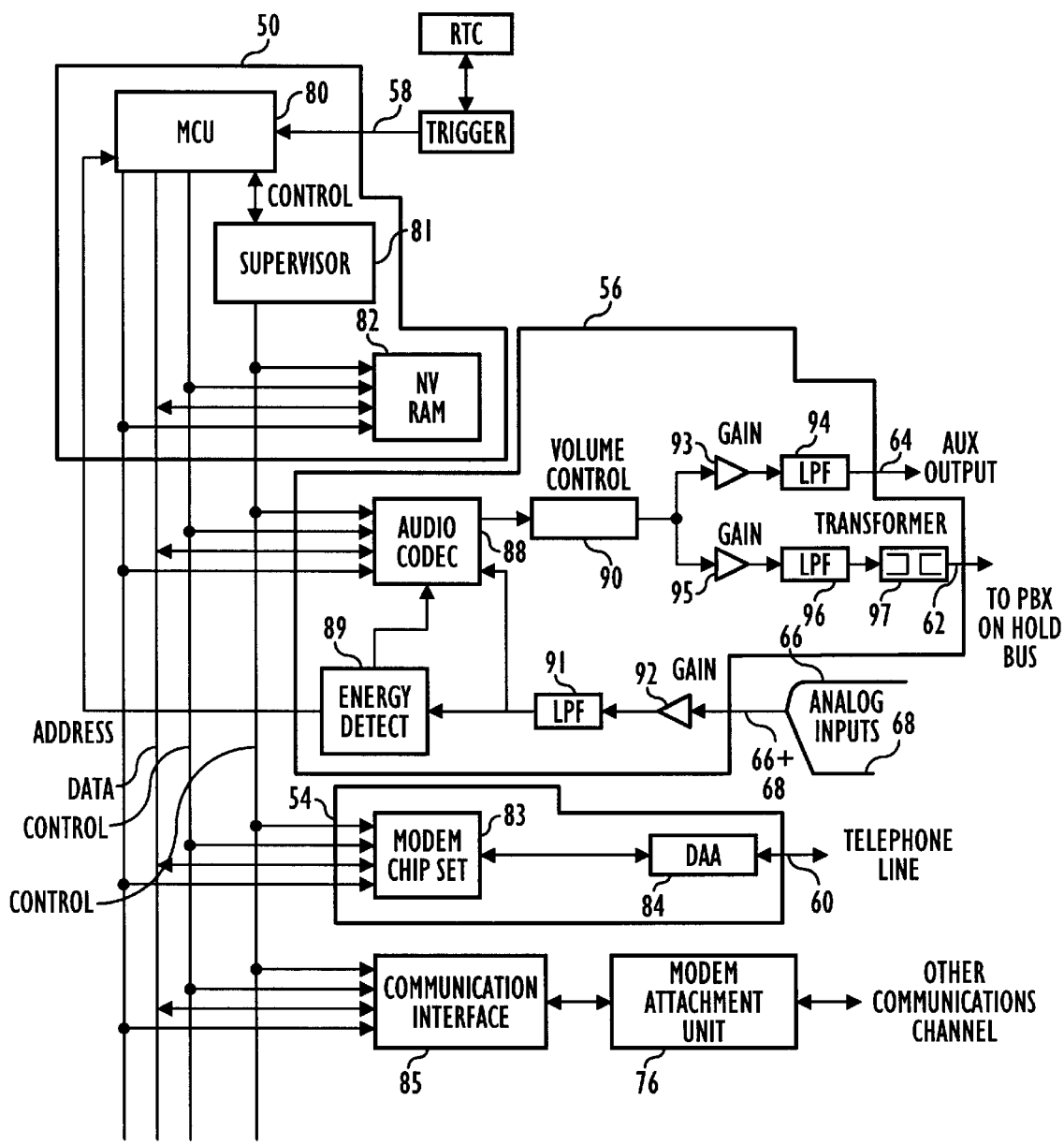
FIG. 5 illustrates another block diagram of the on-hold device.

Referring now to FIG. 5, the on-hold device 30 is illustrated in greater detail. The microcontroller circuit 50 includes a microcontroller chip 80, a supervisor circuit 81 (the operation of which will be explained in greater detail later), and non-volatile RAM 82 which is used during the processing steps performed by the circuit 50. The modem interface 54 preferably includes a modem chip set 83 and a DAA circuit 84. Additionally, as referred to earlier, other digital communication links 85 and 86 can be provided. By way of example only, ISDN, LAN, WAN, T1 and Internet links can be used.

The audio processing and conditioning circuit 56 is also illustrated in greater detail in FIG. 5. It includes a codec 88, an energy detection circuit 89, volume control circuitry 90 and interface components 91 to 97. During the normal mode of operation, the microcontroller 80 causes music or other messages from the input 68 to be processed through the codec 88, the volume control circuit 90, the amplifier 93 and the low pass filter 94 to the AUX OUT output 64. The audio transmitted can either be stored internally in the music on-hold device in the memory 82 or it can be an audio signal received on the analog inputs 66 or 68. If the signal is selected from 66 or 68, then the selection of the signal is done by the codec 88 under microcontroller 80 control. Alternatively, the analog circuitry 92 could select between the signals, also under microcontroller 80 control, and then fed through the codec 88. Further, the signals on the inputs 66 and 68 could be processed independently with separate input channels, but this would increase the hardware costs of the product.

The PBX paging output is received on the analog input 66. The reception of the PBX paging output signal is detected by the energy detection circuit 89. The energy detection circuit 89, upon detection of the paging signal, informs the microcontroller 80 of the arrival of the paging signal. The microcontroller 80 then causes the codec 88 to process the paging signal and to send the signal out on the output 64.

When the microcontroller 80 determines that a message should be broadcast over the pager 20, either because a signal is received on the trigger line 58 or because the microcontroller 80 determines through an internal counter that it is time to "storecast," it controls the codec 88 to process an audio signal stored in the memory 82 to be output on the line 64.

Figure 6:
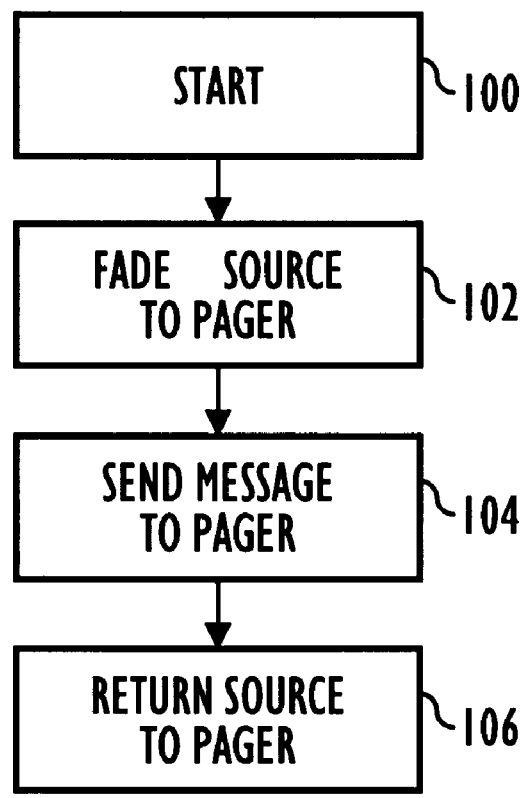
FIG. 6 illustrates the steps performed by a microcontroller in the on-hold device to control the distribution of audio signals to a pager in accordance with the present invention.

In FIG. 6, the steps taken by the on-hold device 30 to transmit audio signals to the pager 20 are illustrated. Normally, the microcontroller 80 controls the audio processing and conditioning circuitry to connect the input 68 to the output AUX OUT 64 so that the music source is connected to the pager 20 and background music is thus broadcast from the speaker 22. In FIG. 6, in step 100, the microcontroller 80 is issued a start command. This command can be issued in a number of different ways, as previously discussed. For example, the start command could be a signal from the PBX that activates the energy detector 89. The start command could also be caused by a signal generated by the on-hold device 30, for example, from the time of day device 79. The start command could also be generated by the trigger line 58.

Regardless of what event triggers the microcontroller 50 in step 100, the microcontroller 50 starts its process, in step 102, by attenuating the connection from the input source 68 to the output AUX OUT 64 so that the background music from the music source fades out. Then, in step 104, the microcontroller 80 causes the message in memory 52 or the page from the PBX 10 to be sent to the audio processing and conditioning circuitry 56 where it is sent to the pager 20. Once the message has been broadcast, in step 106, the microcontroller 80 causes the audio processing and conditioning circuitry 56 to re-connect the input 68 to the output AUX OUT 64, so that the playing of background music starts again.

When the fading occurs in step 102, it is preferred to program the codec 88 to reflect bandwidth differences between the various audio inputs. In the preferred codec 88, a Crystal Semiconductor CS 4231A, the bandwidth of various audio inputs is programmable. Additionally, other variables can be changed in accordance with the particular needs of each input. For example, the compression algorithm and the volume control can be changed, if necessary. In the preferred embodiment of the present invention, the microcontroller 80 selects the proper settings within the codec 88 for each source of audio to effectuate the fading in step 102 so that overall audio quality is maintained.

Digital Downloading

Referring to FIG. 3, in accordance with a further aspect of the present invention, the on-hold device 30 also includes a communication interface 54. The communication interface 54 preferably allows signals, including operating system files and audio files, to be digitally downloaded from a source over a communication link. As previously discussed, the communication interface 54 can be any type of device, including, but not limited to, a dial up modem connected to the public service telephone network (PSTN), an ISDN transceiver or a LAN. In accordance with a presently preferred embodiment, a dial up modem is utilized. A variety of signals can be downloaded, including the microcontroller 50 operating system and new messages (which can be played over the on-hold bus or over the pager) can be stored in the memory 52.

Figure 7:
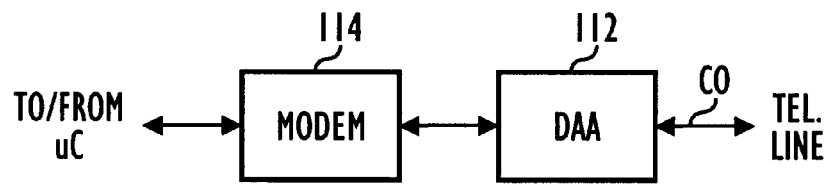
FIG. 7 illustrates the modem interface of the present invention.

Referring now to FIG. 7, a preferred embodiment of the modem interface 54 is illustrated. The modem interface 54 includes a Data Access Arrangement (DAA) 112 and a data modem 114. The DAA 112 is standard circuitry that provides an interface to telephone lines. The modem 114 is also well known circuitry. For example, part number RC144ACX, available from Rockwell International, configured to operate in the data transfer mode, can be used.

Figure 8:
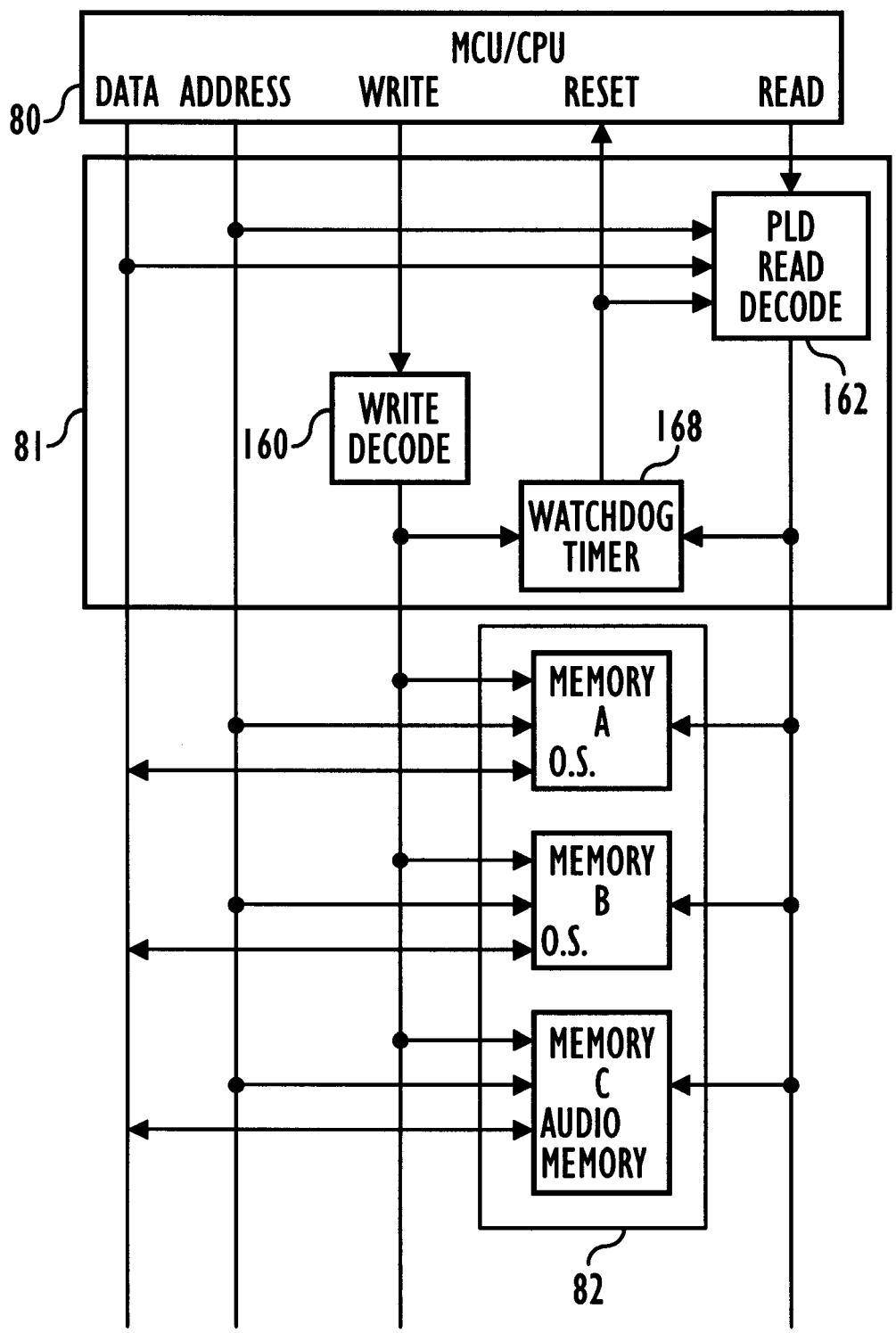
FIG. 8 shows the supervisor circuit, the microcontroller and the memory of the on-hold device.

The on-hold device of the present invention can be downloaded with a new operating system and with new audio signals (which can be used for a variety of purposes, including normal on-hold presentations, storecasting, etc.). In FIG. 8, the memory 82 that stores the operating system and the audio signals is shown subdivided into sections. The first two sections, Block A and Block B, store operating system code and the third section, Block C, stores audio signals.

Figure 9:
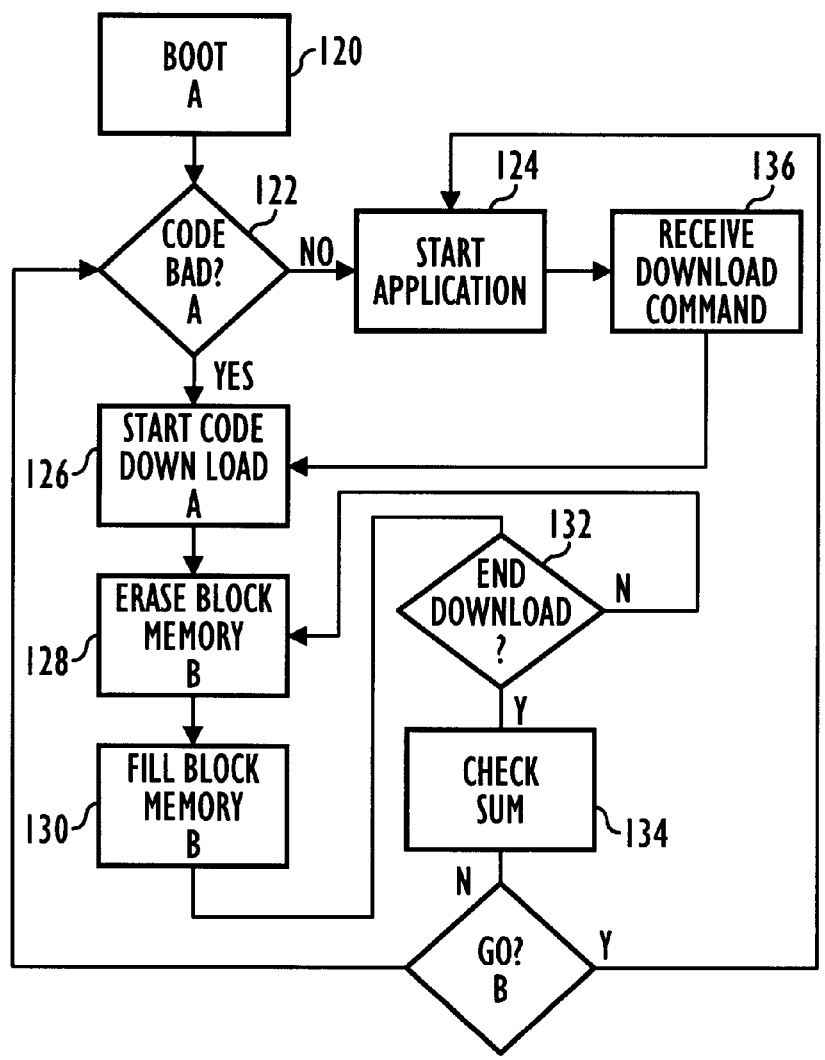
FIG. 9 illustrates the steps performed by the on-hold device when downloading operating system signals.

In FIG. 9, the steps performed by the microcontroller 50 to effectuate the download of operating system code are shown. In step 120, the microcontroller 80 boots. On a power up boot, the operating system code in Block A is used. On a "warm" boot (also known as a reset), the block used is determined by supervisor logic, as will be explained in more detail later. Assume for now that Block A is determined to be the appropriate block.

Next, in step 122, the microcontroller 80 determines whether the operating system code in the block of memory (Block A) is good or faulty. If the code is good, then the microcontroller 80 causes the main program, which is located in the same block of memory being accessed (Block A), to start in step 124. On the other hand, if the operating system code is bad, then the download function assumes control in step 126. During this time, the microcontroller 80 enters a state where it is waiting for the download procedure to start, indicating this state by blinking a LED.

Once a download command is received from a server (also known as a base station) located at the other end of the communication link, in step 128, the microcontroller 80 erases the block in the memory 82 which is not being used, except for a small area of the block which stores the boot code. This area of the memory, the boot section, must be left intact in both Block A and Block B to allow proper operation. Thus, in this example, where the operating system code in Block A is used, all of Block B, except for the boot section, would be erased.

Then, in step 130, the microcontroller 80 fills the block of memory that was erased (Block B in this example) with the operating system received from the base station. The process is handled by the Rockwell R144ACi, using the Rockwell Protocol Interface, preferably with error correction and data compression enabled. In step 132, the microcontroller 80 determines that the downloading process is completed. Then, in step 134, the accuracy of the new operating system code is verified via a checksum. If the checksum is verified, the microcontroller 80 goes to step 124 and starts the new operating system code (in Block B in this example). If the checksum is not verified, the microcontroller 80 goes to step 122 and either requests that the process be repeated or at least informs the base station of the failure.

During normal operation of the operating system, the on-hold device 30 can also receive a download command from the base station. When this occurs, the microcontroller 80 recognizes the command in step 136 and then goes to step 126 to repeat the process previously described.

Also during the normal operation of the operating system, the on-hold device 30 can receive a download command from the base station for audio signals, that is, for the signals that contain the messages to be broadcast by the on-hold device 30. These signals are stored in Block C of the memory 82. While dual blocks of memory could be used to store these signals, it is preferred not to, due to the large size of the files containing these signals.

Figure 10:
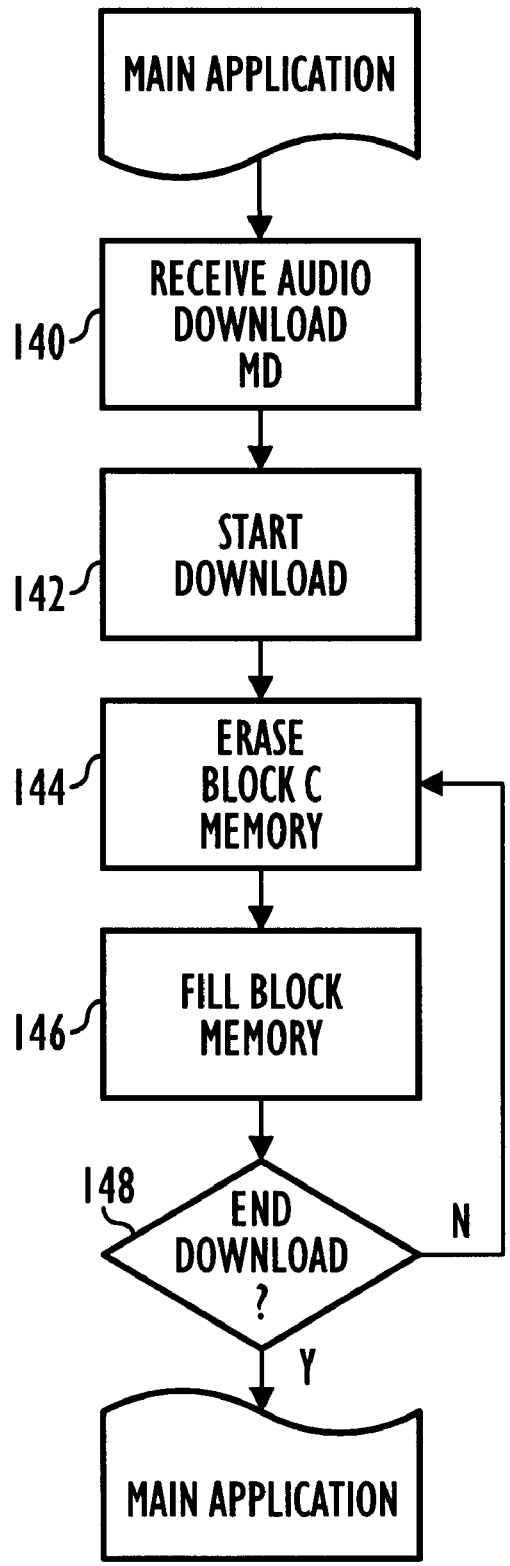
FIG. 10 illustrates the steps performed by the on-hold device when downloading audio files.

Referring now to FIG. 10, the steps performed by the on-hold device 30 to download the audio signals are illustrated. In step 140, the microcontroller 80 recognizes the audio download command. Then, in step 142, the microcontroller 80 starts the download procedure. In step 144, the microcontroller 80 erases the Block C in the memory 82. The microcontroller 80 can either erase the entire Block C or, alternatively, the microcontroller 80 can erase a portion of the Block C that is specified in the audio download command. In step 146, the microcontroller 80 fills Block C with audio signals from the download signal. Due to the large size of the audio files typically downloaded, the downloading generally takes place in blocks of data. At the end of each block, in step 148, the microcontroller 80 determines whether the download process has been completed. If not, the processing continues at step 144. If the download process has been completed, the process returns to the main application software. Multiple audio files, containing multiple audio messages, and including controls indicating the start and end of the various messages, can be downloaded in this fashion.

Figure 11:
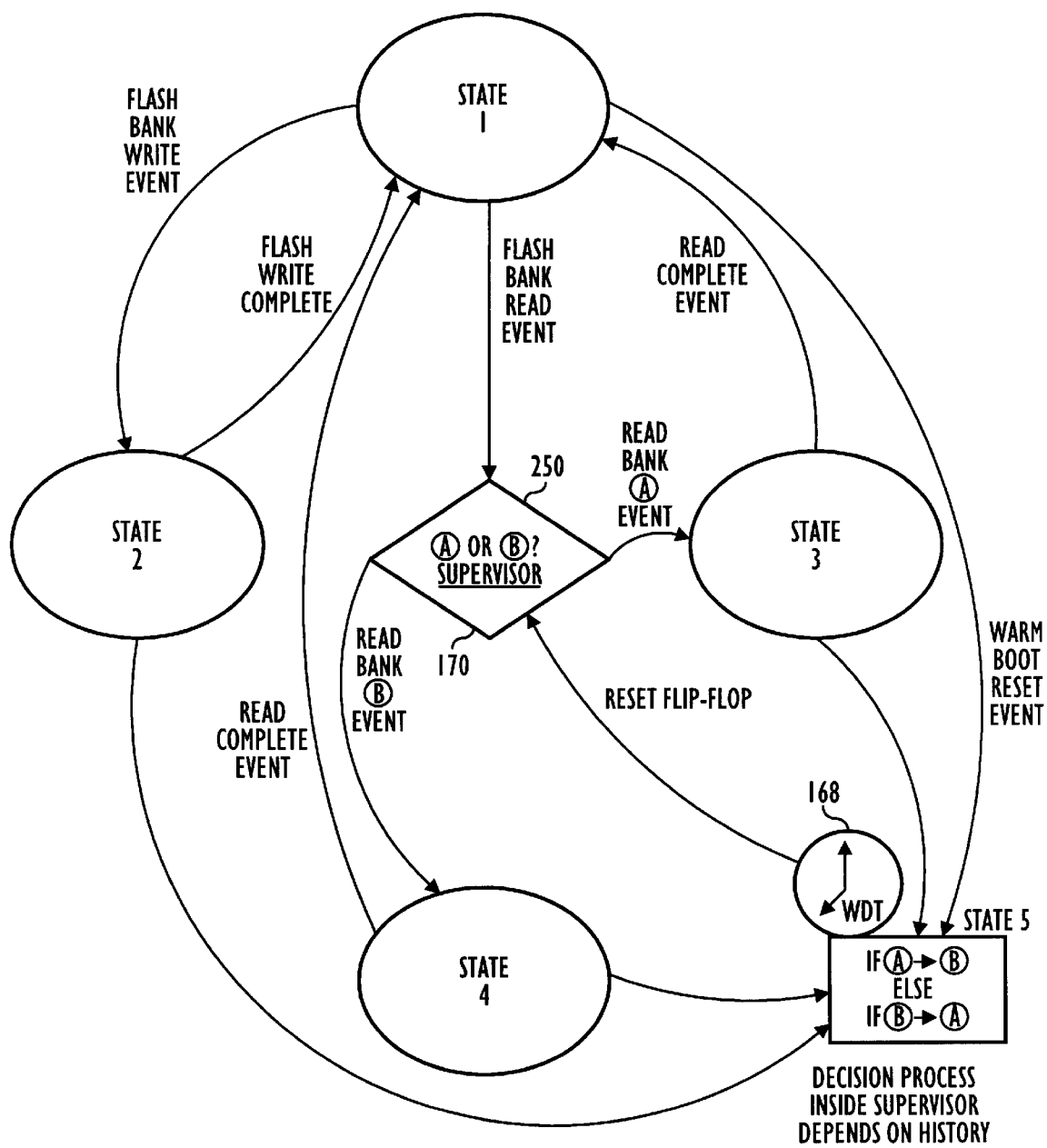
FIG. 11 illustrates the logic of the supervisor circuit in state diagram format.

The access of Block A and Block B in the memory 82 is preferably controlled by the apparatus of FIG. 8, more specifically, by the supervisor circuit 81 which uses the process illustrated in FIG. 11. The supervisor circuit 81 includes a write decode circuit 160, a read decode circuit 162 and a watchdog timer 164.

The watchdog timer 164 is a well known device, preferably implemented with a DS1232, available from Dallas Semiconductor. The microcontroller 80 includes code that addresses the timer 204 from time to time to restart its count period. If for some reason, the microcontroller 80 fails to restart the timer 204, then the timer 204 generates a reset signal to the microcontroller 80. As is usual with watchdog timer 204 designs, the timer circuit should not cause spurious, unintentional resets to be sent to the microcontroller 80.

The write decode circuit 160 is provided to expand the address bus of the microcontroller 80 to allow the spectrum of addresses provided by the flash memory 82 to be addressed. Thus, the flash memory 82 is divided into sections, with the microcontroller 80 first specifying to the write decoder 160 the section being written to and then specifying the address within the section. The particular configuration of the write decode circuit 60 is dependant on the amount of memory 82 used. The write decoder 160 does not play a role in the downloading procedure, other than allowing the full range of memory 82 to be addressed.

The read decode circuit 162 provides control of memory 82 read operations and implements the preferred method of switching between Block A and Block B to allow bad operating system code to be ignored. The read decode circuit 162 directs the operating system read operations to either Block A or to Block B.

The read decode circuit 162 and the write decode circuit 160 are both preferably implemented in a programmable logic device (PLD). In FIG. 11, the state diagram of the PLD is illustrated in accordance with a preferred embodiment of the present invention.

State 1 is the idle state, that is, the microcontroller 80 is not accessing the memory 82. If the microcontroller 80 needs to perform a write to Block A or Block B of the memory 82, as detected by the PLD by monitoring the microcontroller's 80 write control line and the address bus, then the PLD moves to State 2 to perform the write operation by outputting its own write controls. Under normal operation, the PLD returns to State 1 after State 2. However, if a reset is received from the watchdog timer 168, the PLD state will go to the reset event, which will be described shortly.

When in the idle state, State 1, if the microcontroller 80 needs to perform a read of Block A or Block B of the memory 82, as detected by the PLD by monitoring the microcontroller's 80 read control line and the address bus, then the PLD, in step 170, determines which block of memory 82 is currently being used, Block A or Block B, and moves to the next state in accordance with this determination. If Block A is currently being used, the PLD moves to State 3 to cause Block A to be read by outputting its own read controls. On the other hand, if Block B is currently being used, the PLD moves to State 4 to cause Block B to be read.

During States 1 to 4, the watchdog timer 164 can output a reset to the microcontroller 80 as previously described. The PLD, in the read decode logic 162, detects the reset event and enters State 5. In State 5, the PLD determines which block of memory (A or B) was being used last and then causes a switch of the memory block in step 170. Thus, if Block A was being used last, Block B will be used next. But, if Block B was being used last, Block A will be used next. Thus, the supervisor circuit 81 controls the accessing of memory 82 to allow the downloading of the operating system code.

Figure 12:
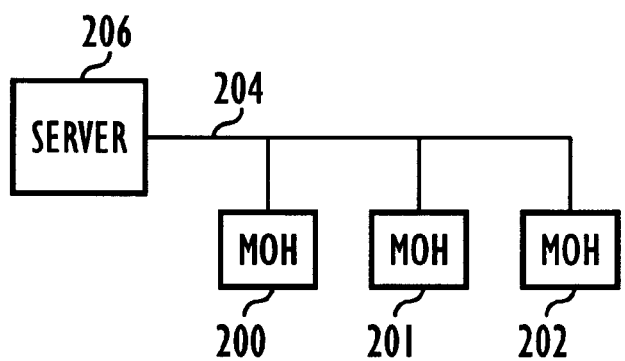
FIG. 12 illustrates a network of on-hold devices.

Referring to FIG. 12, a plurality of on-hold devices 200 to 202 are shown connected to a communication link 204, such as a PSTN line, with a base station or a server 206. The communication link 204 is preferably a digital link, which can again be implemented in a variety of ways, for example, via modem. The base station or server 206 is preferably a personal computer with recording functionality, for example, a Sound Blaster audio card. This provides the personal computer with the capability to store analog signals representative of a message into the hard drive of the personal computer. The messages can be music, announcements (of sales, store hours etc.) or other audio message that needs to be conveyed.

The messages that are downloaded to the on-hold devices 200 to 202 can be composed at the server 206 using the sound capabilities of the server 206 or the messages can be generated elsewhere and stored on the server 206. Similarly, changes to the operating system of the on-hold devices 200 to 202 can be generated at the server 206 or simply stored on the server 206.

If the server 206 is equipped with a single modem, the download to a large chain of stores could be time consuming. Thus, a multiport communication arrangement at the server 206 is preferred in these cases. In this arrangement, the server 206 preferably includes a multiport computer telephony interface (CTI), which is available from many sources, such as Dialogic, to provide the capability of downloading multiple on-hold devices simultaneously. Thus, both audio and operating system files can be downloaded to unique on-hold units at the same time. Further, different audio files may be sent to unique on-hold devices at the same time. At the on-hold device, the operation during a multi-port download is unchanged from what has been discussed.

Figure 13:
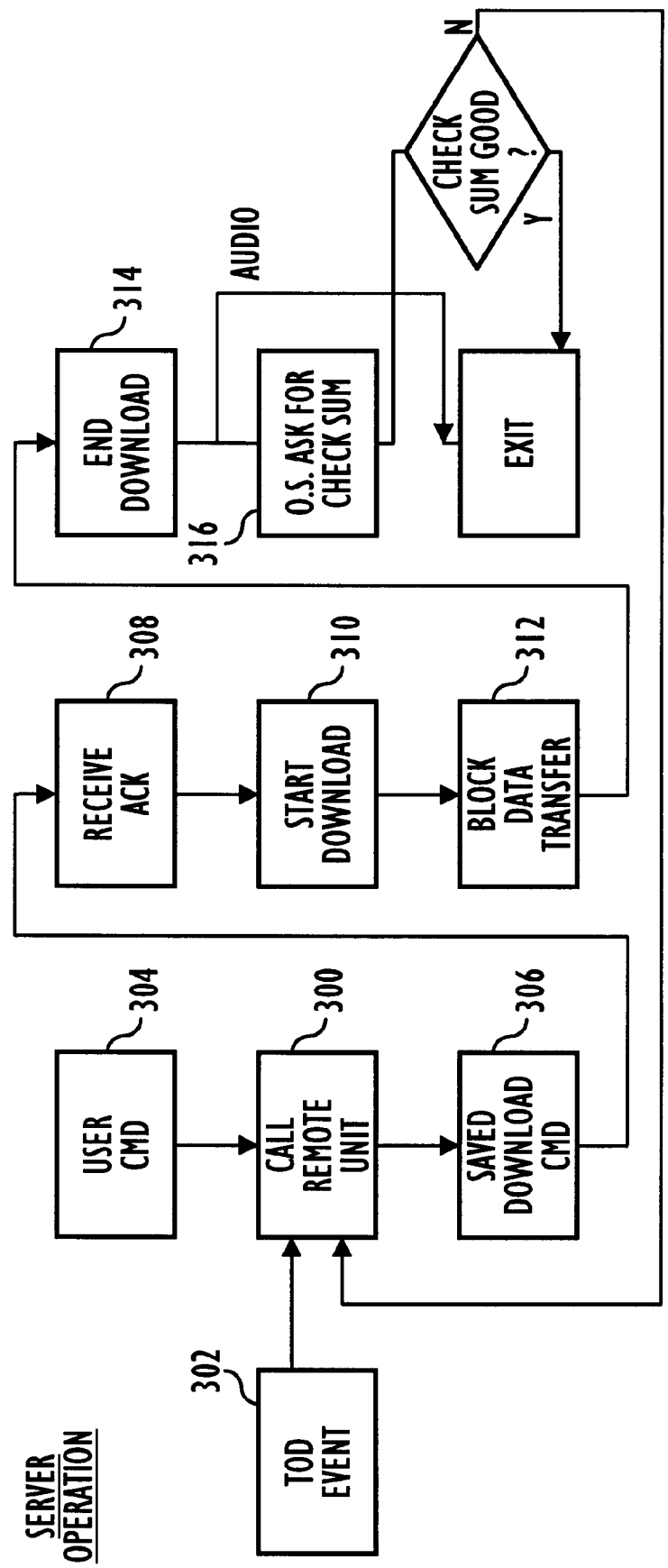
FIG. 13 illustrates the steps performed by the server on the network of FIG. 12 to download signals to the networked on-hold devices.

The server 206 transmits the messages in accordance with the steps of FIG. 13. In step 300, the server 206 calls—in accordance with the protocol of the communication medium—the on-hold device, which, from the server's perspective, is a remote device. Step 300 is generally performed in response to a triggering event, for example, a time of day event in step 302 or a user command in step 304. Once a communication link is established between the server and the on-hold device, the server 206 transmits a download command in step 306, specifying whether it is an operating system or a audio download, as well as any other needed parameters. Then, in step 308, the server 206 waits for an acknowledgment signal from the on-hold device that indicates that the on-hold device is ready for the download. Once the acknowledgment is received, in step 310, the server 206 begins the download procedure. In step 312, the server 206 transmits the operating system or audio files in block data transfer format. In step 314, the server 206 determines that all of the download file has been transmitted. If the download is an operating system download, in step 316, the server requests that the on-hold device transmit a checksum which is determined from the operating system downloaded to verify the accuracy of the download. If the checksum is bad, then the server 206 returns to the start of the process. If the checksum is good, then the download procedure ends. If the download is for an audio file, then it is preferred not to check the checksum, but this procedure could just as easily be performed.

It is understood that changes may be made in the above description without departing from the scope of the invention. It is accordingly intended that all matter contained in the above description and in the drawings be interpreted as illustrative rather than limiting.

We claim:

1. A system for serving at least one location with broadcast audio signals, comprising:
   a pager;
   an on-hold device having an audio output connected to said pager, said on-hold device including a memory for storing audio content, wherein said memory has capacity to store a plurality of messages;
   an audio source connected to said on-hold device,
   means for determining time of day; and
   means, responsive to the means for determining time of day, for causing the on-hold device a to broadcast a selected one of the messages over the pager in accordance with the time of day.

2. The system of claim 1, further comprising means for downloading a plurality of messages and as associated time of day signals for each message to the memory.

3. A method for broadcasting, via a pager, audio signals and stored messages using an on-hold device having a message storing memory, comprising the steps of:
   connecting an audio output from the on-hold device to the pager;
   selectively broadcasting a stored message or an audio signal, or both from the on-hold device through the pager; and
   determining time of day;
   wherein the step of selectively broadcasting further comprises broadcasting a selected one of the messages in accordance with the determined time of day.

4. The method of claim 3, further comprising the step of downloading a plurality of messages and an associated time of day for each message to the message storing memory.

5. A system for selectively broadcasting stored audio from memory, audio from an audio source, or both, said system comprising:
   a pager;
   an on-hold device including a memory for storing audio content and at least one audio input connectable to an audio source said on-hold device being connected to said pager;
   a signal directing device for selectively broadcasting, over said pager, stored audio content from said memory, audio from said audio source, or both; and
   a timer for generating timing signals indicative of the time of day;
   wherein said on-hold device is responsive to said timing signals for broadcasting a selected one of the plurality of messages.

6. A system for selectively broadcasting stored audio from memory, audio from an audio source, or both, said system comprising:
   a pager;
   an on-hold device including a memory for storing audio content and at least one audio input connectable to an audio source, said on-hold device being connected to said pager;
   a signal directing device for selectively broadcasting, over said pager, stored audio content from said memory, audio from said audio source, or both; and
   an interface for remotely downloading the message to the audio content storage memory.

7. The system according to claim 5, wherein said on-hold device further comprises a digital communications interface for downloading a plurality of messages and an associated time of day for each message to the audio content storage memory.

8. A method of selectively broadcasting, by means of a pager connected to an on-hold device, stored audio signals, audio from an audio source, or both, comprising the steps of:
   storing audio content, wherein said audio content comprises a plurality of messages;
   inputting audio from said audio source to said on-hold device;
   selectively broadcasting, said stored audio content via the on-hold device, through the pager;
   determining time of day; and
   playing a selected one of the stored messages in accordance with the time of day.

9. The method according to claim 8, wherein the on-hold device has a message storage memory and further comprising the step of downloading a plurality of messages and as associated time of day for each message to said audio content memory.

* * * * *

UNITED STATES PATENT AND TRADEMARK OFFICE
CERTIFICATE OF CORRECTION

PATENT NO. : 5,912,958
DATED : June 15, 1999
INVENTOR(S) : Giora Eyran, et al

It is certified that error appears in the above-identified patent and that said Letters Patent is hereby corrected as shown below:

ON THE TITLE PAGE: item

[75] Change "David Eric Ostergan" to --David Erik Ostergren--

Signed and Sealed this

Twenty-fifth Day of January, 2000

Attest:

*Attesting Officer*

*Acting Commissioner of Patents and Trademarks*